(12) United States Patent
Hackett

(10) Patent No.: US 8,224,146 B2
(45) Date of Patent: Jul. 17, 2012

(54) BLOCK-OUT DEVICE FOR FIBER OPTIC ADAPTER

(75) Inventor: Jason O. Hackett, Canton, GA (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/700,864

(22) Filed: Feb. 5, 2010

(65) Prior Publication Data

US 2011/0194828 A1 Aug. 11, 2011

(51) Int. Cl.
*G02B 6/00* (2006.01)

(52) U.S. Cl. .......................... 385/139; 385/134; 385/88

(58) Field of Classification Search .................. None
See application file for complete search history.

(56) References Cited

U.S. PATENT DOCUMENTS

| | | |
|---|---|---|
| 2,613,562 A | 10/1952 | Clark |
| 2,640,382 A | 6/1953 | Grossman |
| 3,570,096 A | 3/1971 | Sosinski |
| 3,951,514 A | 4/1976 | Medina, Jr. |
| 4,155,159 A | 5/1979 | Hogan et al. |
| 4,311,883 A | 1/1982 | Kidney |
| 4,380,118 A | 4/1983 | Driver et al. |
| 4,624,516 A | 11/1986 | White |
| 4,649,613 A | 3/1987 | Bednarik |
| 4,713,016 A | 12/1987 | Kato |
| 4,789,348 A | 12/1988 | Hampton |
| 4,887,972 A | 12/1989 | McLean et al. |
| 5,265,328 A | 11/1993 | Gorman |
| 5,402,562 A | 4/1995 | Saito et al. |
| 5,414,790 A | 5/1995 | Lee et al. |
| 5,429,522 A | 7/1995 | Noschese et al. |
| 5,556,295 A | 9/1996 | McFadden et al. |
| 5,625,943 A | 5/1997 | Lyonnais |
| 5,637,002 A | 6/1997 | Buck et al. |
| 5,984,705 A | 11/1999 | Miyazaki et al. |
| 6,006,422 A | 12/1999 | Hickox |
| 6,227,717 B1 | 5/2001 | Ott et al. |
| 6,249,960 B1 | 6/2001 | Faesel |
| 6,309,247 B1 | 10/2001 | Wang |

(Continued)

FOREIGN PATENT DOCUMENTS

EP 1762871 B1 1/2009

(Continued)

OTHER PUBLICATIONS

Panduit's LC Duplex Adapter Blockout Devices Specification Sheet, 2 pages, Jan. 2010.

*Primary Examiner* — Hemang Sanghavi

(74) *Attorney, Agent, or Firm* — Robert A. McCann; Christopher S. Clancy; Aimee E. McVady

(57) ABSTRACT

The present invention is directed to a device that protects a fiber optic adapter from contamination, damage or misuse. The fiber optic adapter includes latches that extend from inner sides of the adapter. The device includes a front, a back and sides. The sides extend from the front to the back. Each side includes a slot molded along the sides of the device. The slots receive the latches of the fiber optic adapter when the device is installed in the fiber optic adapter. Once the latches are installed in the slots, the device is secured to the fiber optic adapter.

9 Claims, 10 Drawing Sheets

U.S. PATENT DOCUMENTS

| | | |
|---|---|---|
| 6,628,878 B2 * | 9/2003 | Akeda et al. ............... 385/134 |
| 6,634,096 B1 | 10/2003 | Yamamoto et al. |
| 6,785,460 B2 | 8/2004 | DeJong et al. |
| 6,817,089 B2 | 11/2004 | Whitehead |
| 6,863,556 B2 | 3/2005 | Viklund et al. |
| 6,913,393 B2 | 7/2005 | Buck et al. |
| 6,918,782 B2 | 7/2005 | Foster |
| 7,037,129 B2 | 5/2006 | Lo et al. |
| 7,090,539 B1 | 8/2006 | Mazur |
| 7,163,414 B2 | 1/2007 | Lo et al. |
| 7,164,840 B2 | 1/2007 | Hsieh |
| 7,257,888 B2 | 8/2007 | Nelson et al. |
| 7,275,313 B2 | 10/2007 | Ichida et al. |
| 7,297,013 B2 | 11/2007 | Caveney et al. |
| 7,354,291 B2 | 4/2008 | Caveney et al. |
| 7,438,584 B2 | 10/2008 | Caveney et al. |
| 7,530,824 B2 | 5/2009 | Bolain |
| 7,534,128 B2 | 5/2009 | Caveney et al. |
| 7,572,066 B2 | 8/2009 | De Jong et al. |
| 7,578,690 B2 | 8/2009 | Caveney et al. |
| 7,632,125 B2 | 12/2009 | Irwin et al. |
| 7,706,657 B1 * | 4/2010 | McQuiggan ............... 385/139 |
| 2006/0040564 A1 | 2/2006 | Morrison et al. |
| 2006/0269212 A1 | 11/2006 | Beck et al. |
| 2007/0217749 A1 * | 9/2007 | Jong et al. ............... 385/88 |
| 2009/0007609 A1 | 1/2009 | Obenshain |

FOREIGN PATENT DOCUMENTS

| | | |
|---|---|---|
| GB | 1508214 | 4/1978 |
| WO | 2007106477 A2 | 9/2009 |

* cited by examiner

BLOCK-OUT DEVICE FOR FIBER OPTIC ADAPTER

FIELD OF THE INVENTION

The present invention relates to a block-out device, and more particularly to a block-out device for a SC fiber optic adapter.

BACKGROUND OF THE INVENTION

Block-out covers are frequently inserted into jack modules to protect the jack module and prevent entry of undesirable objects. Some covers include multiple parts or special latch connectors that secure the cover to the jack modules. Other covers have relatively large open areas designed to receive a flat tool that would enable the end user to release the cover from the jack module so that it could be removed from the jack module. The covers with the larger open areas, however, may be accidentally removed from the jack module. There are also covers that are inserted in the opening of a jack module and then locked by a rotating key. These covers may only be removed by inserting the key and rotating it to unlock or release the cover from the jack module.

Dust covers or block-out covers have also been used to prevent fiber optic adapters and connectors from being contaminated. The prior art dust covers often do not provide an adequate seal thereby allowing dust or other material to contaminate the adapter or the connector. Prior art dust covers are also typically difficult to install and remove from the adapter or the connector.

Thus, it is desirable to provide a tamper resistant block-out device for a SC fiber optic adapter that prevents contamination, damage or misuse of the adapter. It would also be desirable to provide a block-out device and a removal tool where the device would not be accidentally removed from the adapter but would be easily removed from the adapter by a simple tool. One such block-out device designed for a LC fiber optic adapter has been introduced in commonly owned U.S. patent application Ser. No. 12/404,768, the contents of which are herein incorporated by reference.

SUMMARY OF THE INVENTION

The present invention is directed to a device that protects a fiber optic adapter from contamination, damage or misuse. The fiber optic adapter includes latches that extend from inner sides of the adapter. The device includes a front, a back and sides. Each side includes a slot molded along the sides of the device. When the device is installed in the adapter, the slots receive the latches to secure the device in the fiber optic adapter.

DETAILED DESCRIPTION

Figure 1:
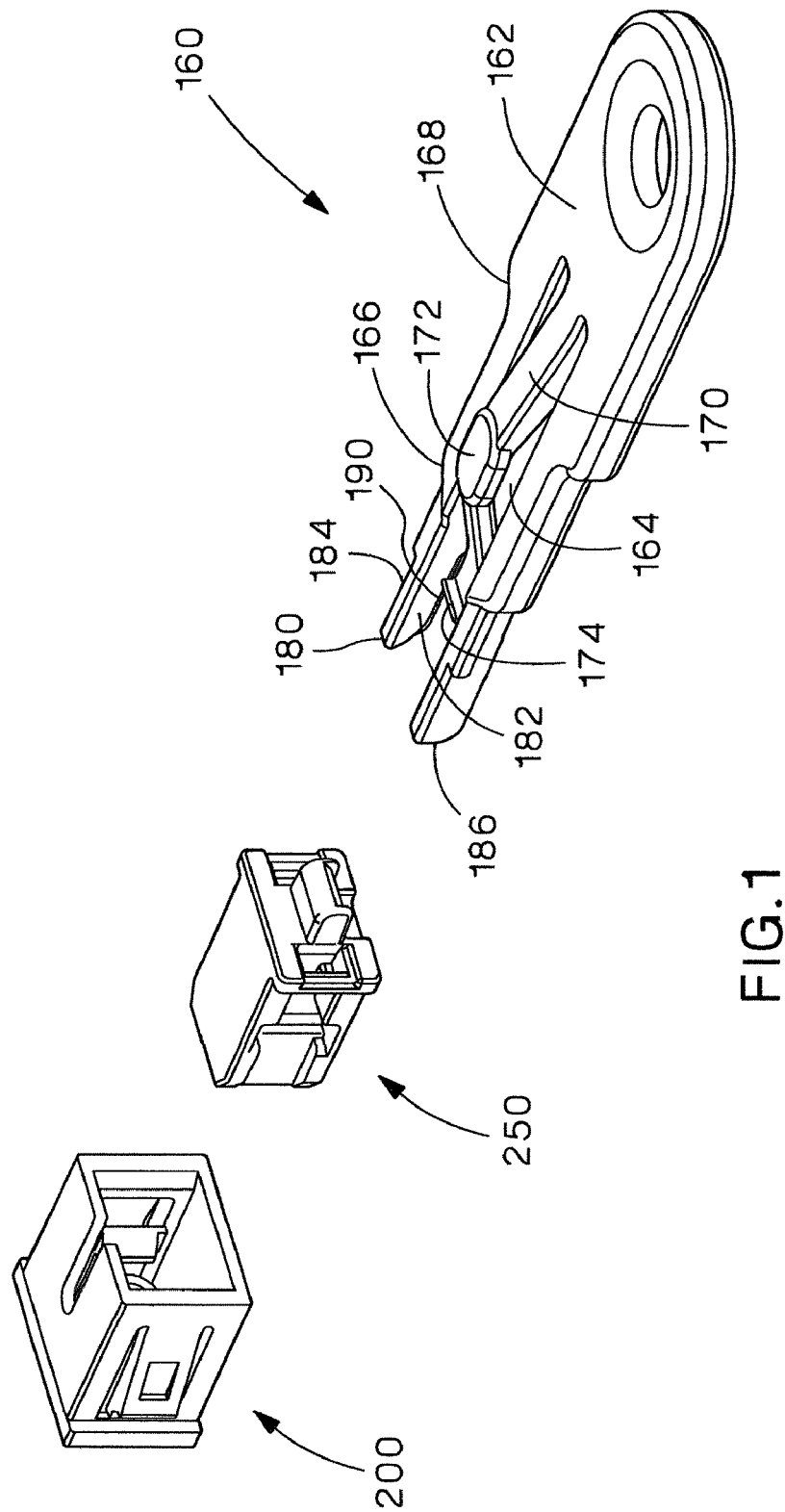
FIG. 1 illustrates an exploded view of a SC fiber optic adapter with a SC adapter block-out device and removal tool of the present invention.

FIG. 1 illustrates an exploded view of the SC fiber optic adapter 200 and the SC adapter block-out device 250 and removal tool 160 of the present invention. The SC adapter block-out device 250 snaps into the SC fiber optic adapter 200 to prevent access, damage or misuse of the SC fiber optic adapter 200 when the SC fiber optic adapter 200 is not in use. As described below, once the SC adapter block-out device 250 is installed, a removal tool 160 is required to remove the SC adapter block-out device 250 from the SC fiber optic adapter 200. The removal tool 160 is similar to the removal tool described in commonly owned U.S. patent application Ser. No. 11/207,853, the contents of which are herein incorporated by reference.

The removal tool 160 includes a body 162 with an opening 164 in the center of the removal tool 160 and angled front edges 166, 168. The removal tool 160 also includes a release lever 170 positioned within the opening 164 and prongs 180 that extend outwardly from the front edge 166 of the removal tool 160. The release lever 170 has a raised knob 172 located near the center of the release lever 170 and an upwardly facing hook 174 located at the free end of the release lever 170. The prongs 180 include an inner side 182, an outer side 184 and a front end 186. The inner side 182 of each prong 180 includes a curved or cam surface 190 that extends from the front end 186 of each prong 180 downwards towards the front end 186 of the removal tool 160.

Figure 2:
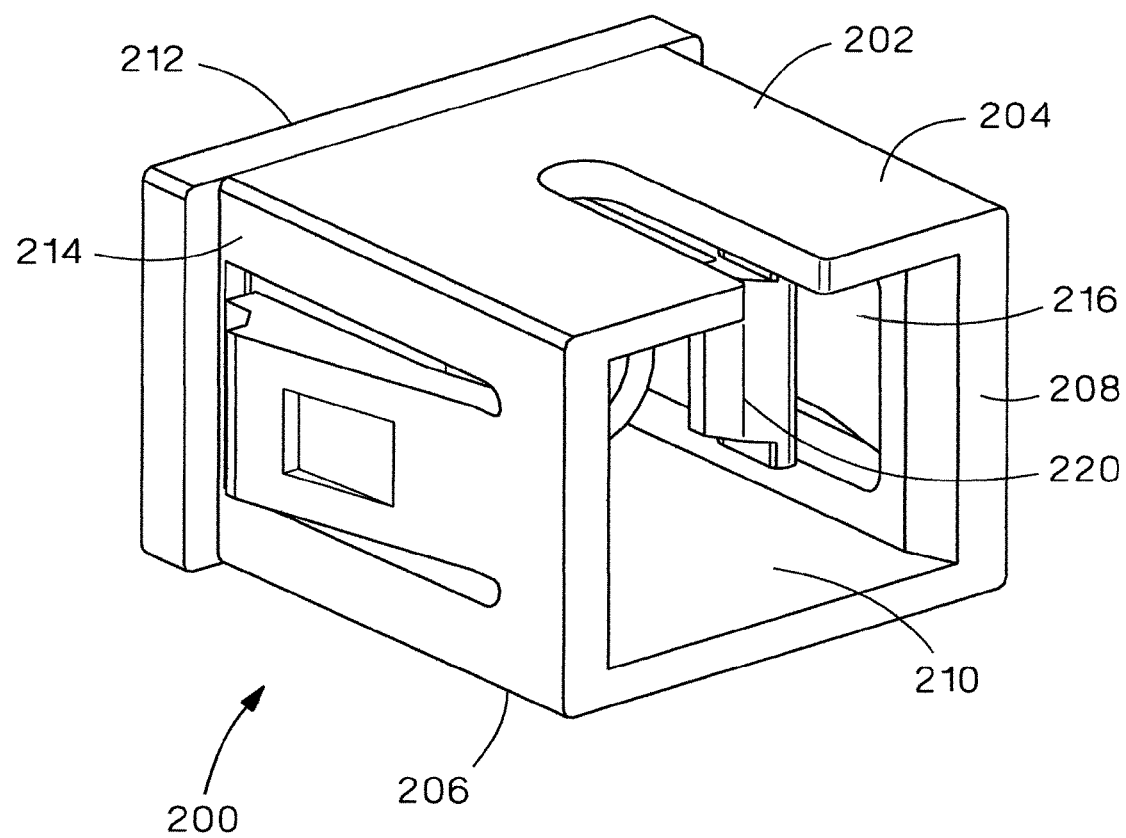
FIG. 2 illustrates a front perspective view of the SC fiber optic adapter of FIG. 1.
Figure 3:
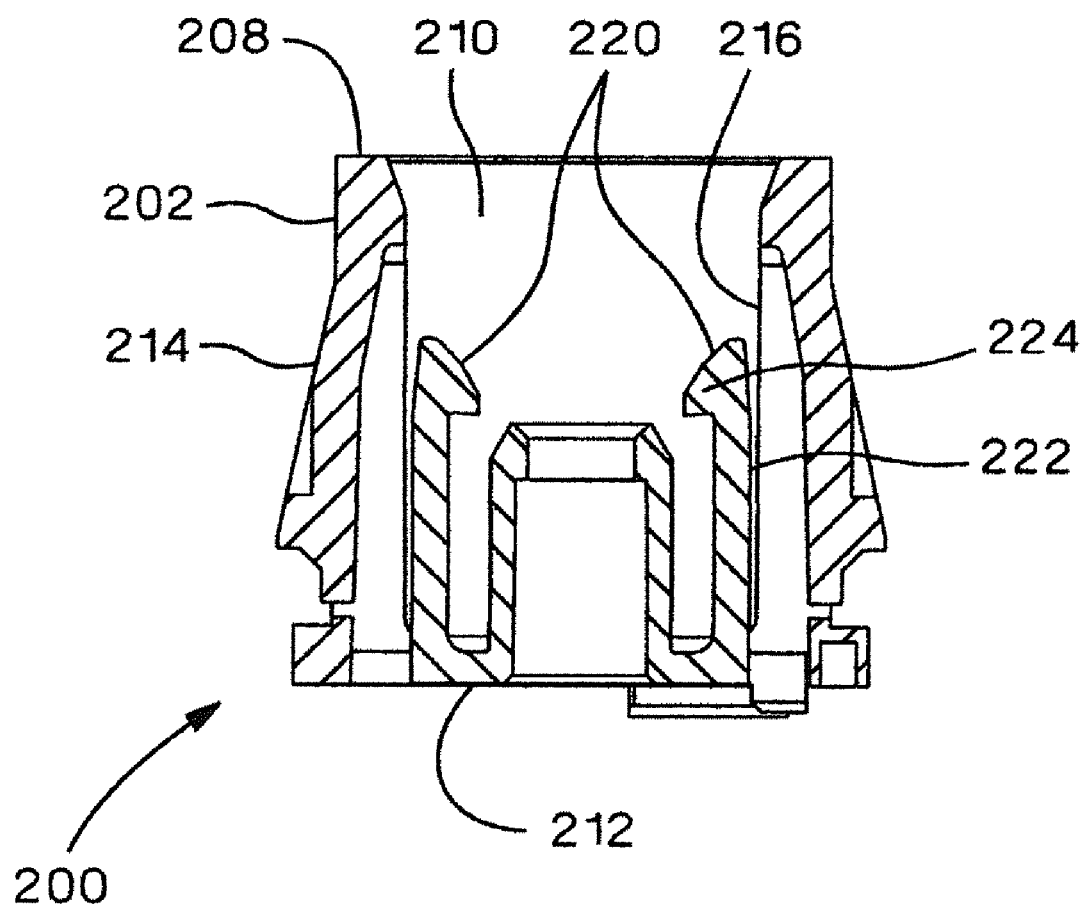
FIG. 3 illustrates a cross sectional view of the SC fiber optic adapter of FIG. 2.

FIG. 2 and FIG. 3 illustrate the SC fiber optic adapter to be used with the SC adapter block-out device of the present invention. The SC fiber optic adapter 200 includes a housing 202 with a top 204, a bottom 206, a front 208, a back 212 and outer sides 214. The front 208 of the SC fiber optic adapter 200 includes an opening 210 that receives the SC adapter block-out device 250.

Molded latches 220 are located along the inner sides 216 of the SC fiber optic adapter 200. Each molded latch 220 includes a leg 222 with an inwardly extending hook 224 located at the end of each leg 222.

Figure 4:
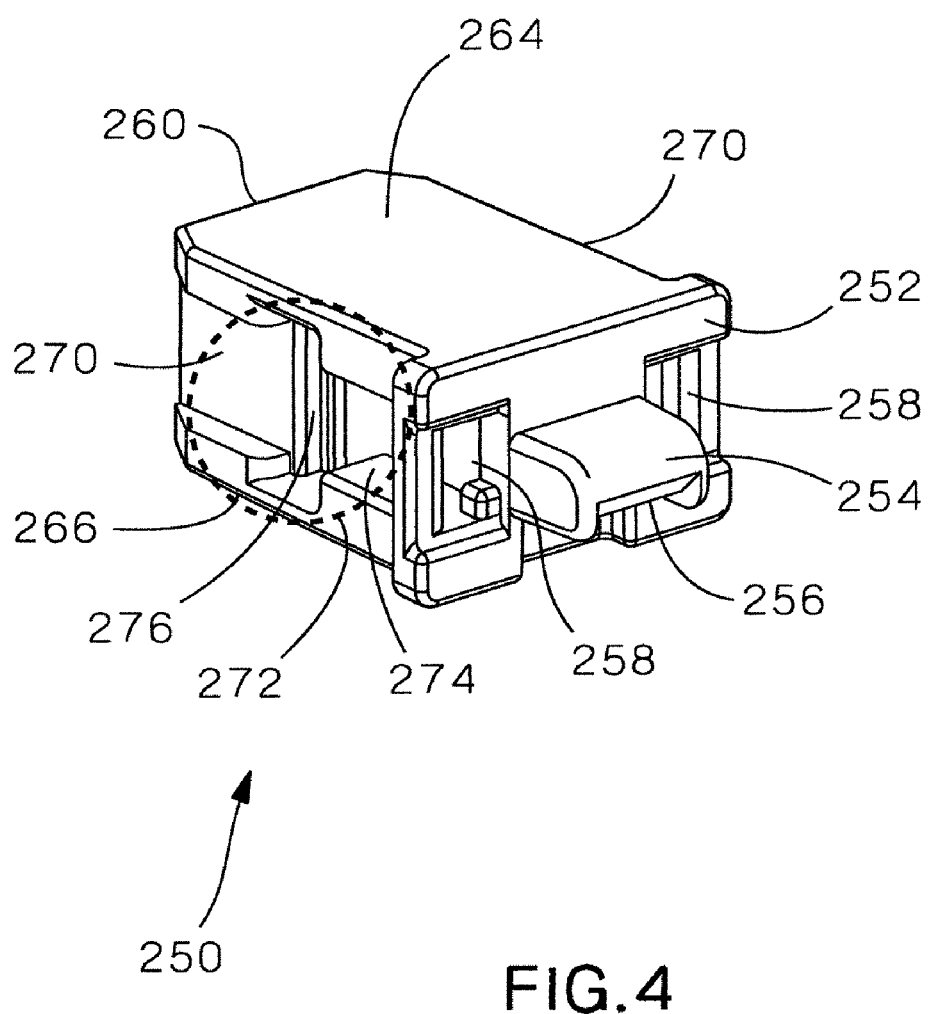
FIG. 4 illustrates a front perspective view of the SC adapter block-out device of FIG. 1.
Figure 5:
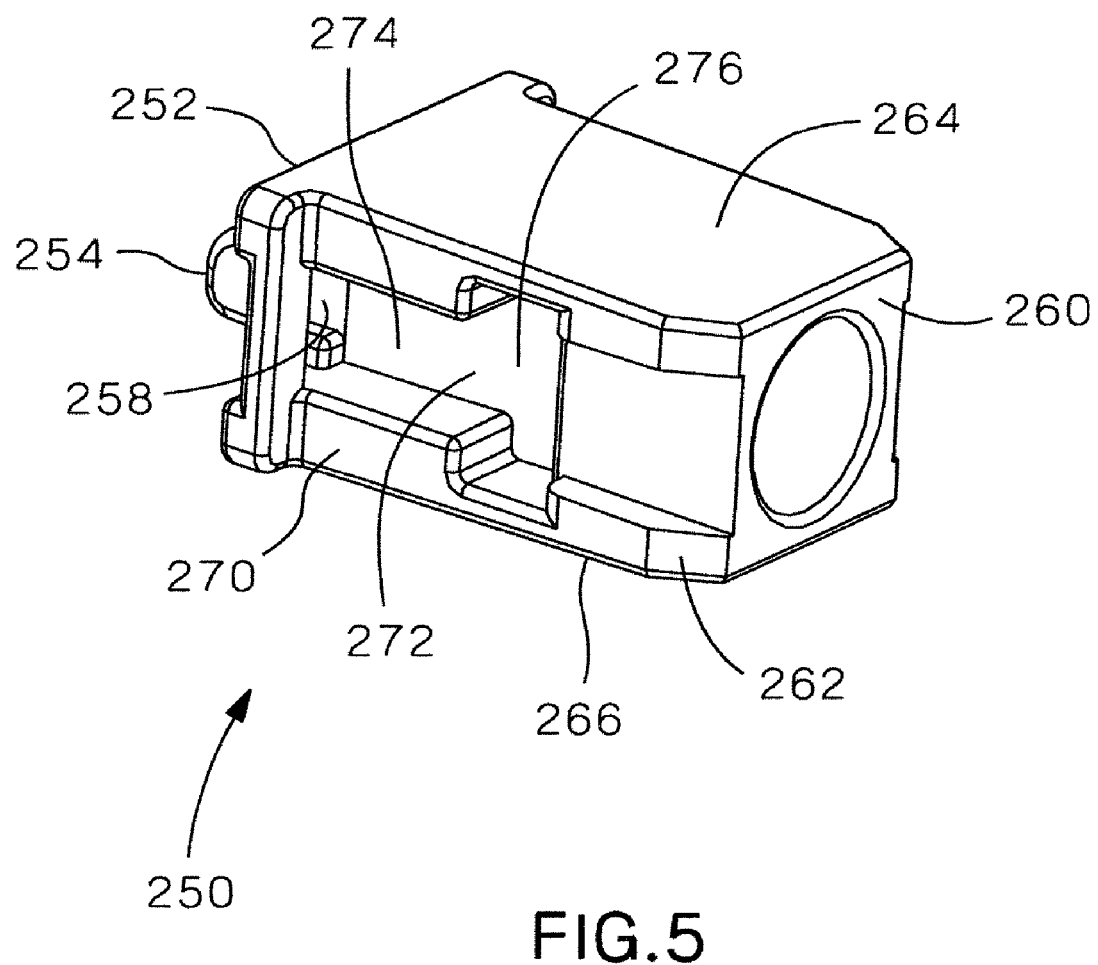
FIG. 5 illustrates a rear perspective view of the SC adapter block-out device of FIG. 4.
Figure 6:
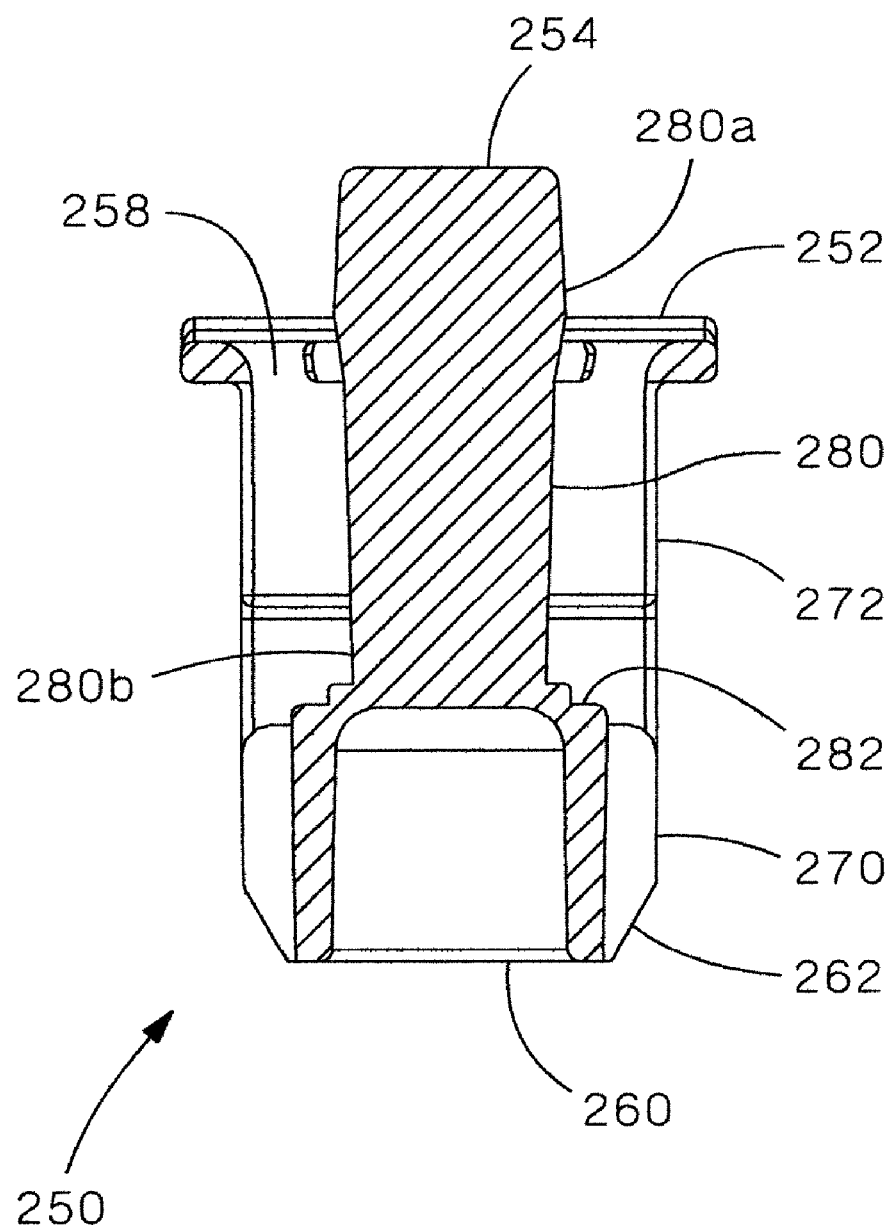
FIG. 6 illustrates a cross sectional view of the SC adapter block-out device of FIG. 5.

FIGS. 4-6 illustrate the SC adapter block-out device 250. The SC adapter block-out device 250 is a single piece designed to snap into the SC fiber optic adapter 200. The SC adapter block-out device 250 includes a front 252, a back 260, a top 264, a bottom 266 and sides 270.

As illustrated in FIGS. 4 and 5, each side 270 of the SC adapter block-out device 250 includes a molded slot 272. The molded slots 272 include a first portion 274 that extends horizontally in the side of the device and a second portion 276 that extends vertically in the side of the device. The first portion 274 extends from the front 252 of the device towards the back 260 of the device 250 to the second portion 276. The second portion 276 is perpendicular to the first portion 274 and extends generally from the top 264 to the bottom 266 of the SC adapter block-out device 250.

The front 252 of the SC adapter block-out device 250 includes an attachment member 254 with a downwardly facing hook 256 (see FIG. 10) for engaging the removal tool 160. The front 252 of the block-out device 250 also includes an open area 258 or hole adjacent each side of the attachment member 254 for receiving the prongs 180 of the removal tool 160.

As illustrated in FIG. 5, the back 260 of the device 250 includes ramp surfaces 262. The ramp surfaces 262 are angled surfaces that extend from the back 260 toward the sides 270 of the SC adapter block-out device 250. The ramp surfaces 262 facilitate the insertion of the SC adapter block-out device 250 into the SC fiber optic adapter 200.

FIG. 6 illustrates a cross sectional view of the SC adapter block-out device 250. The SC adapter block-out device 250 also includes inner walls 280 that guide the prongs 180 of the removal tool 160 when the removal tool 160 is inserted into the SC adapter block-out device 250. The inner walls 280 extend from a first end 280a at the front of the device and angle inward to a second end 280b toward the center of the device. The inner walls 280 extend the length of the first portion 274 of the molded slots 272. An inner step 282 is located at each side of the second ends 280b of the inner walls 280. The inner steps 282 engage the inwardly extending hooks 224 extending from the legs 222 of the molded latches 220 when the SC adapter block-out device 250 is installed in the SC fiber optic adapter 200.

Figure 7:
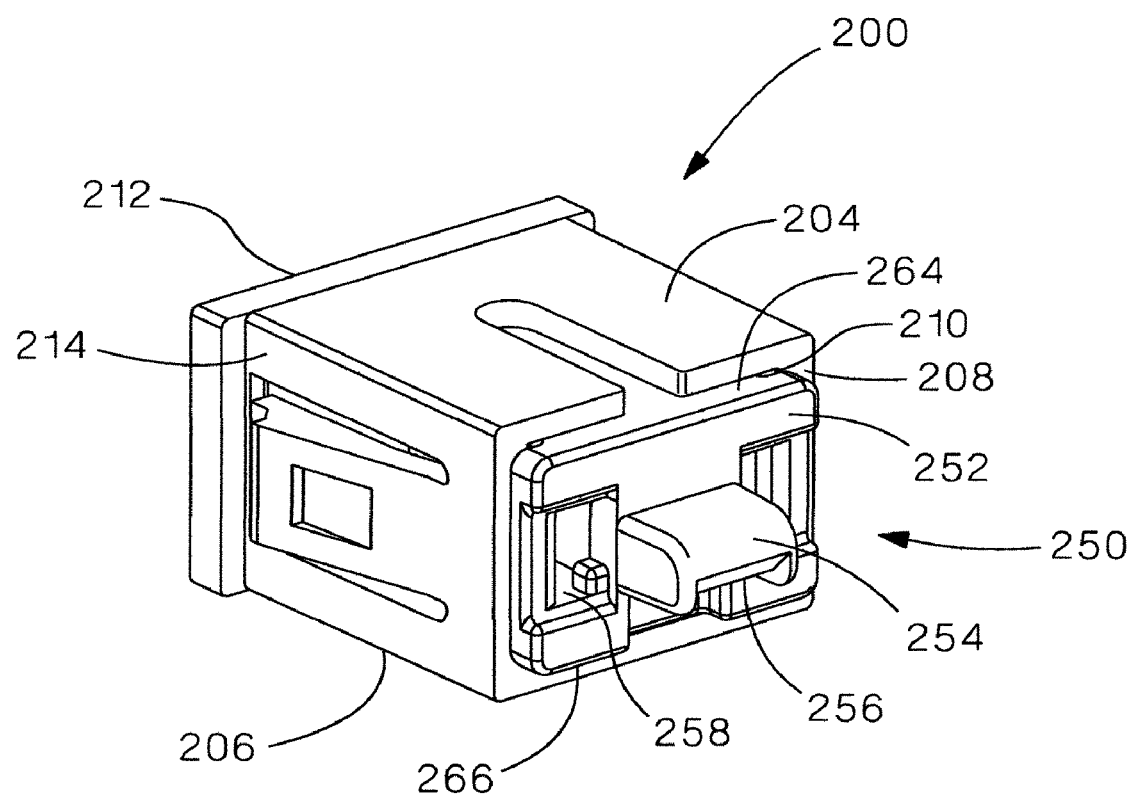
FIG. 7 illustrates a front perspective view of the SC adapter block-out device of FIG. 4 installed in the SC fiber optic adapter of FIG. 2.
Figure 8:
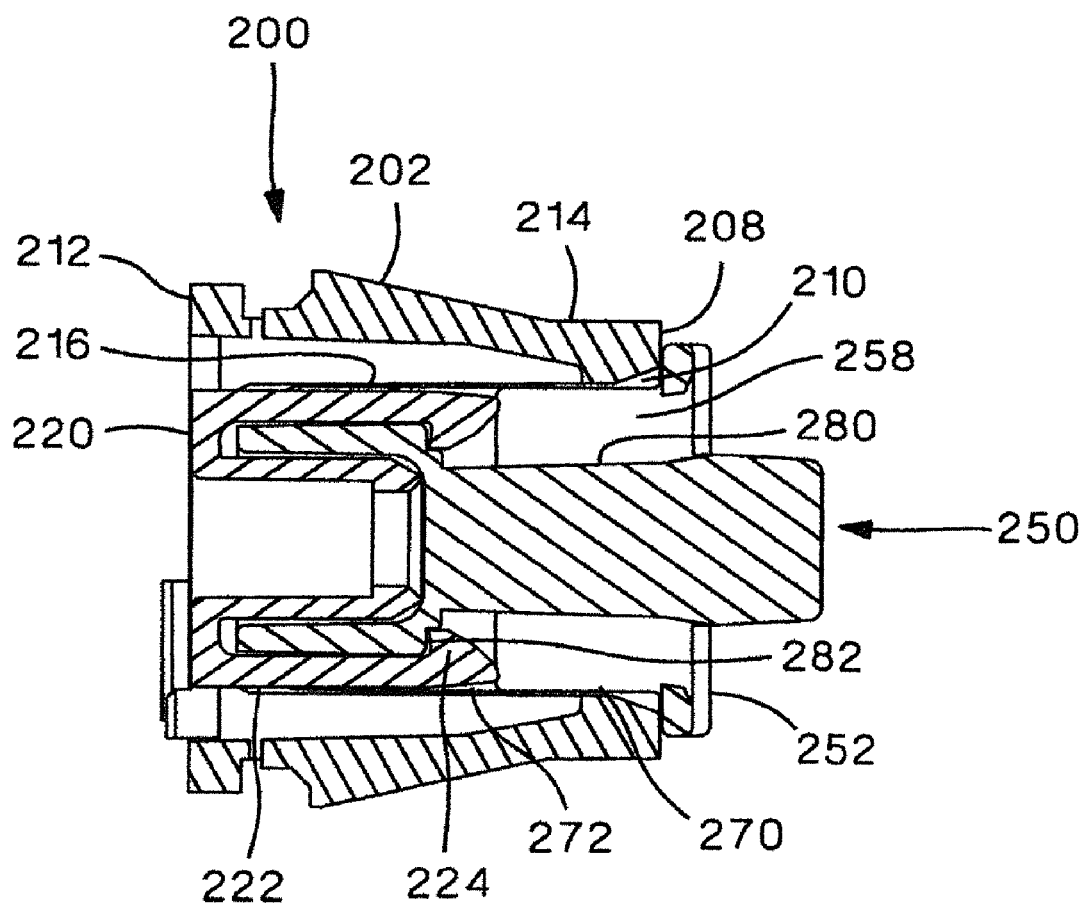
FIG. 8 illustrates a partial cross sectional view of the SC adapter block-out device installed in the SC fiber optic adapter of FIG. 7.

FIGS. 7 and 8 illustrate the SC adapter block-out device 250 installed in the SC fiber optic adapter 200. When the SC adapter block-out device 250 is installed in the SC fiber optic adapter 200, the molded latches 220 are deflected outward as the molded latches 220 contact the ramped surfaces 262 of the SC adapter block-out device 250. Once the molded latches 220 reach the molded slots 272 in the sides 270 of the SC adapter block-out device 250, the molded latches 220 snap back into their original position. As illustrated in FIG. 8, the hooks 224 of the molded latches 220 engage the inner steps 282 thereby locking the SC block-out device 250 in the SC fiber optic adapter 200.

Figure 9:
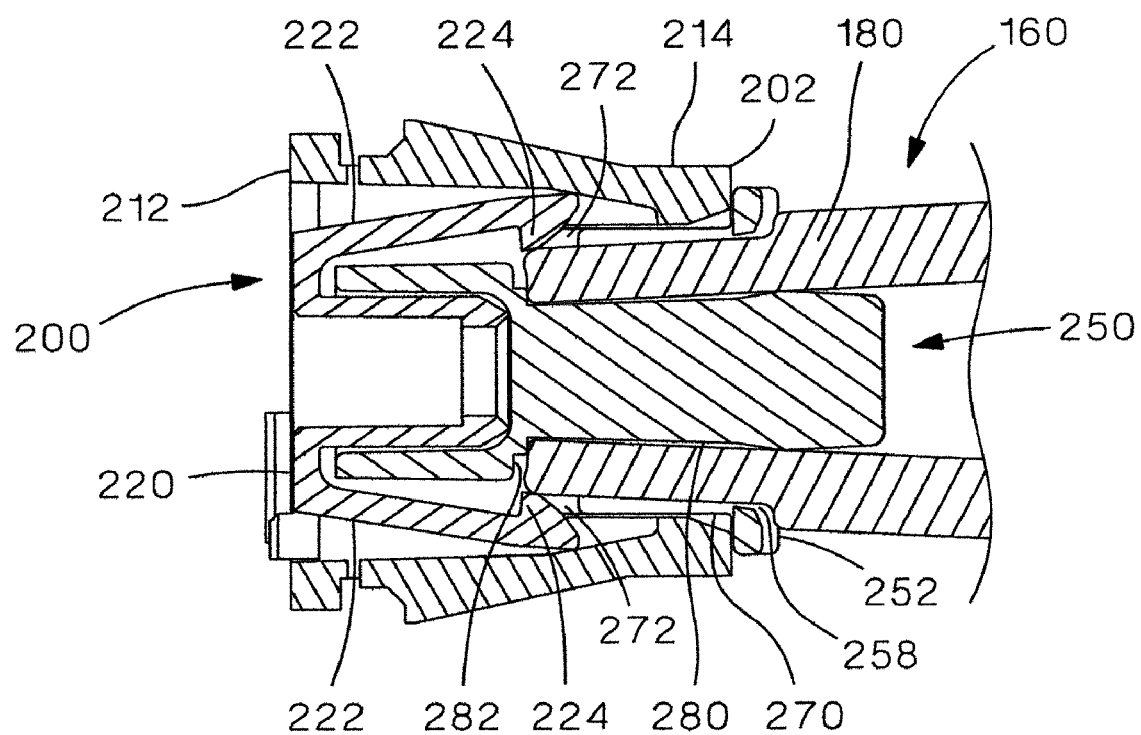
FIG. 9 illustrates a partial cross sectional view of the removal tool installed in the SC adapter block-out device and the SC fiber optic adapter of FIG. 8.
Figure 10:
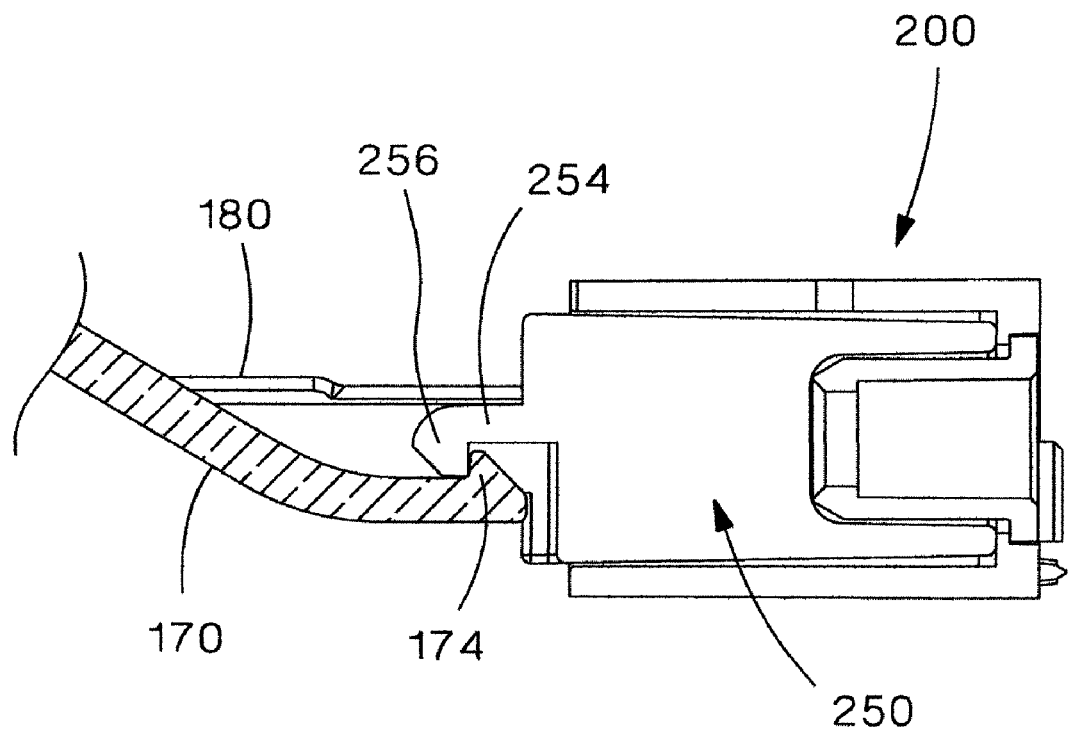
FIG. 10 illustrates a cross sectional view of the removal tool of FIG. 1 installed in the SC adapter block-out device and SC fiber optic adapter of FIG. 9.

FIGS. 9 and 10 illustrate the removal tool installed in the block-out device 250 to remove the SC adapter block-out device 250 from the SC fiber optic adapter 200. The prongs 180 of the removal tool 160 are inserted into the open areas 258 adjacent the attachment member 254. As the removal tool 160 is installed in the SC adapter block-out device 250, the prongs 180 slide between the inner walls 280 and the molded latches 220 forcing the molded latches 220 to deflect outwards. As the molded latches 220 are deflected, the molded latches 220 are removed from the molded slots 272 of the SC adapter block-out device 250. As a result, the SC adapter block-out device 250 is unlocked and may be removed from the SC fiber optic adapter 200.

Additionally, as the removal tool 160 is inserted in the SC adapter block-out device 250, the hook 174 of the removal tool 160 engages the hook 256 of the attachment member 254 extending from the front 252 of the SC adapter block-out device 250 to secure the removal tool 160 to the SC adapter block-out device 250.

Once the removal tool 160 is fully installed and the molded latches 220 have been deflected, the SC adapter block-out device 250 and attached removal tool 160 may be removed from the SC fiber optic adapter 200. Once the SC adapter block-out device 250 has been removed from the SC fiber optic adapter 200, the raised knob 172 of the release lever 170 may be depressed to disengage the hook 174 of the removal tool 160 from the hook 256 of the attachment member 254 extending from the front 252 of the SC adapter block-out device 250.

The removal tool 160 and the SC adapter block-out device 250 of the present invention provide a safe and secure device for blocking the SC fiber optic adapter 200. The SC adapter block-out device 250 is tamper resistant since it is designed so that it may only be removed with the two pronged removal tool 160. As a result, the SC adapter block-out device 250 would not accidentally or undesirably be removed by various available tools, such as a screwdriver or other flat tool.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A blockout device and a fiber optic adapter comprising:
a blockout device including a front, a back, a top and a bottom, wherein the front of the blockout device includes openings and an attachment member,
the blockout device further including sides extending from the front to the back, wherein each side includes an opening extending from adjacent the front towards the back of the blockout device, wherein the opening includes a first portion and a second portion, the first portion and the second portion extend into the device and are covered by the top and the bottom;
wherein the openings in the front of the device are in communicating with the openings in the sides of the device; and
a fiber optic adapter including a housing with latches extending from inner sides of the housing, wherein the latches of the fiber optic adapter slide along the sides of the blockout device and enter the second portion of the opening to secure the blockout device in the fiber optic adapter.

2. The device of claim 1, wherein the first portion extends from adjacent the front towards the back of the device and the second portion extends from the first portion.

3. The device of claim 2, wherein the second portion is perpendicular to the first portion.

4. The device of claim 1, wherein the device includes inner walls, the inner walls extend from a first end at the front of the device to a second end.

5. The device of claim 4, wherein the inner walls are angled inwardly.

6. The device of claim 4, wherein inner steps are located at the second end of the inner walls, wherein the latches engage the inner steps when the latches are positioned within the second portion of the opening.

7. The device of claim 1, wherein the back of the device includes ramp surfaces, whereby the ramp surfaces deflect the latches as the device is installed in the fiber optic adapter.

8. The device of claim 1, wherein the openings in the front of the device receive a removal tool for engaging the latches of the adapter.

9. The device of claim 8, wherein the device includes inner walls extending from a first end at the front of the device to a second end, whereby the inner walls guide the removal tool when installed in the openings in the front of the device.

* * * * *